(12) United States Patent  
Schrecker et al.

(10) Patent No.: US 9,021,595 B2  
(45) Date of Patent: *Apr. 28, 2015

(54) ASSET RISK ANALYSIS

(71) Applicant: McAfee, Inc., Santa Clara, CA (US)

(72) Inventors: Sven Schrecker, Pasadena, CA (US); Stephen Ritter, Encinitas, CA (US); Ryan Nakawatase, San Diego, CA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/949,129

(22) Filed: Jul. 23, 2013

(65) Prior Publication Data

US 2013/0340084 A1 Dec. 19, 2013

Related U.S. Application Data

(63) Continuation of application No. 12/627,706, filed on Nov. 30, 2009, now Pat. No. 8,495,745.

(51) Int. Cl.
*H04L 29/06* (2006.01)
*G06F 21/57* (2013.01)

(52) U.S. Cl.
CPC .......... *G06F 21/577* (2013.01); *H04L 63/1433* (2013.01); *G06F 2221/034* (2013.01); *H04L 63/00* (2013.01)

(58) Field of Classification Search
CPC .................................................... G06F 21/577
USPC .......................................................... 726/25
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,134,664 A | 10/2000 | Walker | |
| 6,460,050 B1 | 10/2002 | Pace et al. | |
| 6,631,473 B2 | 10/2003 | Townsend | |
| 7,096,502 B1 | 8/2006 | Fox et al. | |
| 7,260,844 B1 | 8/2007 | Tidwell et al. | |
| 7,506,155 B1 | 3/2009 | Stewart et al. | |
| 7,530,104 B1 | 5/2009 | Thrower et al. | |
| 7,653,942 B2 | 1/2010 | Tamura et al. | |
| 7,712,137 B2 * | 5/2010 | Meier .............................. | 726/25 |

(Continued)

OTHER PUBLICATIONS

Notice of Allowance received for U.S. Appl. No. 12/627,706, mailed on Mar. 14, 2013, 12 pages.

(Continued)

*Primary Examiner* — Michael S McNally
(74) *Attorney, Agent, or Firm* — Patent Capital Group

(57) ABSTRACT

Methods, systems, and apparatus, including computer programs encoded on computer storage media, for asset risk analysis. One method includes receiving threat definition data for threats, vulnerability detection data for assets, and countermeasure detection data for assets. The method further includes determining a respective risk metric for each of the assets for each of the threats. This includes analyzing the vulnerability detection data for an asset to determine whether the asset is vulnerable to a threat, determining from the threat definition data and the countermeasure detection data whether the asset is protected by one of the countermeasures identified for the threat, and determining the risk metric for the asset for the threat according to whether the asset is vulnerable to the threat and whether the asset is protected by one of the countermeasures identified for the threat.

22 Claims, 9 Drawing Sheets

(56) References Cited

U.S. PATENT DOCUMENTS

| | | | |
|---|---|---|---|
| 7,748,041 B2 | 6/2010 | Anzai et al. | |
| 7,818,802 B2 | 10/2010 | Szor et al. | |
| 7,890,869 B1 | 2/2011 | Mayer et al. | |
| 7,891,003 B2 * | 2/2011 | Mir et al. | 726/25 |
| 7,904,960 B2 | 3/2011 | Ithal | |
| 7,913,303 B1 | 3/2011 | Rouland et al. | |
| 7,962,960 B2 * | 6/2011 | Fudge | 726/25 |
| 8,095,983 B2 * | 1/2012 | Guruswamy | 726/25 |
| 8,095,984 B2 | 1/2012 | McFarlane et al. | |
| 8,132,260 B1 | 3/2012 | Mayer et al. | |
| 8,166,551 B2 | 4/2012 | King | |
| 8,201,257 B1 | 6/2012 | Andres et al. | |
| 8,495,745 B1 | 7/2013 | Schrecker et al. | |
| 2004/0049698 A1 | 3/2004 | Ott et al. | |
| 2004/0103309 A1 | 5/2004 | Tracy et al. | |
| 2004/0193892 A1 | 9/2004 | Tamura et al. | |
| 2005/0044418 A1 * | 2/2005 | Miliefsky | 713/201 |
| 2006/0010493 A1 * | 1/2006 | Piesco et al. | 726/23 |
| 2006/0015941 A1 | 1/2006 | McKenna | |
| 2006/0101517 A1 | 5/2006 | Banzhof et al. | |
| 2006/0136327 A1 | 6/2006 | You | |
| 2006/0265324 A1 | 11/2006 | Leclerc et al. | |
| 2006/0265751 A1 | 11/2006 | Cosquer et al. | |
| 2007/0016955 A1 | 1/2007 | Goldberg et al. | |
| 2007/0061571 A1 | 3/2007 | Hammes et al. | |
| 2007/0192344 A1 | 8/2007 | Meier et al. | |
| 2007/0192867 A1 * | 8/2007 | Miliefsky | 726/25 |
| 2007/0250932 A1 | 10/2007 | Kothari | |
| 2009/0024627 A1 | 1/2009 | King | |
| 2009/0099885 A1 | 4/2009 | Sung et al. | |
| 2009/0106843 A1 | 4/2009 | Kang et al. | |
| 2009/0328206 A1 | 12/2009 | Bardsley et al. | |
| 2010/0125912 A1 | 5/2010 | Greenshpon et al. | |
| 2010/0241974 A1 | 9/2010 | Rubin et al. | |
| 2010/0325412 A1 | 12/2010 | Norrman et al. | |
| 2010/0333002 A1 | 12/2010 | Karabey et al. | |
| 2011/0119765 A1 | 5/2011 | Hering et al. | |

OTHER PUBLICATIONS

Non Final Office Action received for U.S. Appl. No. 12/627,706, mailed on Sep. 17, 2012, 35 pages.

Response to Non Final Office Action for U.S. Appl. No. 12/627,706, filed on Dec. 17, 2012, 19 pages.

McAfee, Use Case Scenarios: McAfee Risk Advisor 2.7, 2012, McAfee, Inc., pp. 1-15.

"Preventsys Introduces Latest Version of Enterprise Security Management", SecurityProNews, [online]. [Retrieved on May, 18, 2012]. Retrieved from Internet Electronic mail: http://www.securitypronews.com/news/securitynews/spn-45-20040927PreventsysintroducesLatestVersionofEnterpriseSecurityManagement.html. 2 pages, copyright 2012 FE.

"Skybox Risk Control", Skybox Security [online]. [Retrieved on May, 18, 2012]. Retrieved from Internet electronic mail: http://www.skyboxsecurity.com/securityrisk, 2 pages. Copyright 2002-2010, Skybox Security, Inc.

"Skybox Network Assurance", Skybox Security [online]. [Retrieved on May 18, 2012]. Retrieved from Internet electronic mail: http://www.skyboxsecurity.com/networkcompliance. 2 pages. Copyright 2002-2010 Skybox Security, Inc.

"Skybox Firewall Assurance", Skybox Security [online]. [Retrieved on May 18, 2012]. Retrieved from Internet electronic mail: http://www.skyboxsecurity.com/firewallcompliance. 2 pages. Copyright 2002-2010 Skybox Security, Inc.

"Skybox Threat Manager", Skybox Security [online]. [Retrieved from Internet electronic mail: http://www.skyboxsecurity.com/products/threat-manager%20. 2 pages. Copyright 2002-2010, Skybox Security, Inc.

"Intrusion prevention system", [online]. [Retrieved on May 18, 2012]. Retrieved from Internet electronic mail: http://en.wikipedia.org/wiki/Intrustion_prevention_system, 3 pages. Last modified on May 2, 2012.

"Intrusion detection system", [online]. [Retrieved on May 18, 2012]. Retrieved from Internet electronic mail: http://en.widipedia.org/wiki/Intrustion_detection_system, 6 pages. Last modified on Apr. 16, 2012.

"Foundstone's Threat Correlation Module Prioritizes Critical Threats Facing Every Enterprise System", [online]. [Retrieved on May 18, 2012]. Retrieved from Internet electronic mail: http://findarticles.com/particles/mi__mOEIN/is_2003_Sept_15/ai_107753228/, 4 pages. Sep. 15, 2003.

"Mcafee Vulnerability Manager", [online]. [Retrieved on May 18, 2012]. Retrieved from Internet electronic mail: http://www.it-cube.net/loesungen/it-security/vulnerability-risk-mgmt/foundstone/downloads/?no_cache=1&tx_abdownloads_pi1%5Baction%5D=getviewclickeddownload&tx_abdownloads_pi1%5.

"Foundstone Remediation", [online]. [Retrieved on May 18, 2012]. Retrieved from Internet electronic mail: http://www.it-cube.net/loesungen/it-security/vulnerability-risk-mgmt/foundstone/downloads/7no_cache=1&tx_abdownloads_pi1%5Baction%5D=getviewclickeddownload&tx_abdownloads_pi1%5.

"Foundstone Threat Correlation Module", [online]. [Retrieved on May 18, 2012]. Retrieved from Internet electronic mail: http://www.it-cube.net/loesungen/it-security/vulnerability-risk-mgmt/foundstone/downloads/?no_cache=1&t_abdownloads_pi1%5Baction%5D=getviewclickeddownload&Tx_abdownloads_pi1%5.

"Complete Risk Management", [online]. [Retrieved from Internet electronic mail: http://www.it-cube.net/loesungen/it-security/vulnerability-risk-mgmt/foundstone/downloads/?no_cache=1&tx_abdownloads_pi1%5Baction%5D=getviewclickeddownload&tx_abdownloads_pi1%5Buid%5D=233&tx_abdownloads_p.

"Release Notes for McAfee Vulnerability Manager 7.0.0", [online]. [Retrieved on May 18, 2012]. Retrieved from Internet electronic mail: http://www.it-cube.net/loesungen/it-security/vulnerability-risk-mgmt/foundstone/downloads/?no_cache=1&tx_abdownloads_pi1%5Baction%5D=getviewclickeddownload$tx_abdownloads_pi1%5Bu.

* cited by examiner

Threat Asset Coverage Information:

Summary

Vulnerable

Threat Name: Threat XZYA14217 (Example OS Server Vulnerability) ⌐ 552
System Name: EX-SYS ⌐ 554
Overall Status: Vulnerable
    Applicability: Applicable
    Vulnerability: Vulnerable  ⎬ 556
    Countermeasures: Unknown

Details

Applicability

Applicable

| | Expected ⌐558 | Observed ⌐560 | State ⌐562 |
|---|---|---|---|
| Operating System | example OS | Example OS Server 2003 (SP2) | Applicable |
| Operating System | example OS-2003_x64 | Example OS Server 2003 (SP2) | Applicable |

Vulnerability Detectors

Vulnerable ⌐566

| | Expected ⌐568 | Observed ⌐570 | State ⌐572 |
|---|---|---|---|
| Vulnerability Manager | 6190 | 6190 (Yes) | Vulnerable |
| Security Content Automation Protocol | def:115234 | | Unknown |
| Security Content Automation Protocol | def: 25431 | | Unknown |
| Security Content Automation Protocol | def: 13452 | | Unknown |

Countermeasures

Unknown ⌐576

| | Expected ⌐578 | Observed ⌐580 | State ⌐582 |
|---|---|---|---|
| Intrusion Prevention System | 428 | | Unknown |

FIG. 5B

ASSET RISK ANALYSIS

RELATED APPLICATION

This Application is a continuation (and claims the benefit of priority under 35 U.S.C. §120) of U.S. application Ser. No. 12/627,706, filed Nov. 30, 2009, Inventors Sven Schrecker, et al., entitled "ASSET RISK ANALYSIS". The disclosure of the prior application is considered part of (and is incorporated by reference in) the disclosure of this application.

BACKGROUND

This specification relates to analyzing risk in a system of assets. An asset is a computer or other electronic device. A system of assets can be connected over one or more networks. For example, a home might have five assets, all of which are networked to each other and connected to the outside world through the Internet. As another example, a business might have three physically separate offices, each of which has many assets. The assets within each office and the assets across the offices can be connected over a network.

A system administrator is often interested in knowing the risk that each asset in the system faces for each of various threats to the assets. Each threat corresponds to a potential attack on the asset by a particular virus, malware, or other unauthorized entity. An attack occurs when the unauthorized entity exploits a known vulnerability of the asset in an attempt to access or control the asset.

Risk calculation systems calculate risk for individual assets for individual threats. Risk is determined from both the likelihood of an attack corresponding to a threat occurring and the damage likely to be suffered if the attack were to occur.

System administrators want a complete risk assessment of the entire system. However, conventional risk calculation systems do not provide as accurate of a risk characterization for entire systems as is desired. One reason is that, in order to accurately calculate risk, accurate and complete data is needed; however, the data used by conventional systems is often incomplete. Traditional vulnerability detection systems indicate when an asset is vulnerable, but do not indicate when an asset is not vulnerable. If the detection system does not indicate that an asset is vulnerable, a risk calculation system does not know if the asset was not tested for the vulnerability, or if the asset was tested and is not vulnerable.

Another reason is that risk calculation systems often receive data from only agent-based sensors or only network-based sensors, and not both. This further results in incomplete data. In addition, conventional systems have difficulty determining which assets are protected by network-based sensors.

Yet another reason is that conventional risk systems focus on either vulnerability of assets (e.g., is an asset vulnerable to a threat) or countermeasure protection for an asset (e.g., is an asset protected from a threat), but not both. This results in an incomplete picture of risk in a system.

Yet another reason is that when an attack is detected on an asset, it can sometimes be difficult to uniquely identify the asset that was attacked.

SUMMARY

This specification describes technologies relating to asset risk analysis.

In general, one aspect of the subject matter described in this specification can be embodied in methods that include the actions of receiving, at a data processing apparatus, threat definition data, the threat definition data including, for each of one or more threats, an identification of the threat and an identification of one or more countermeasures that reduce a risk that the threat will affect an asset; receiving, at the data processing apparatus, vulnerability detection data for each of one or more assets and countermeasure detection data for each of the one or more assets, wherein the vulnerability detection data for each asset identifies threats to which the asset is vulnerable and the countermeasure detection data for each asset identifies one or more countermeasures protecting the asset; and determining, with the data processing apparatus, a respective risk metric for each of the one or more assets for each of the one or more threats, the determining including, for a particular asset and a particular threat: analyzing the vulnerability detection data for the particular asset to determine whether the particular asset is vulnerable to the particular threat; determining from the threat definition data and the countermeasure detection data whether the particular asset is protected by one of the countermeasures identified for the particular threat; and determining the risk metric for the particular asset for the particular threat according to whether the particular asset is vulnerable to the particular threat and whether the particular asset is protected by one of the countermeasures identified for the particular threat. Other embodiments of this aspect include corresponding systems, apparatus, and computer programs recorded on computer storage devices, each configured to perform the operations of the methods.

These and other embodiments can each optionally include one or more of the following features. The vulnerability detection data for an asset can further identify threats to which the asset is not vulnerable. Determining the risk metric for the particular asset and the particular threat can be further based on whether the particular asset is not vulnerable to the particular threat. The threat definition data can further include, for each of the one or more threats, applicability data describing one or more configurations of assets that the threat applies to. The method can further include receiving configuration data for each asset, the configuration data describing a configuration of each asset. Determining the risk metric for the particular asset for the particular threat can further include determining from the applicability data for the particular threat and the configuration data for the particular asset whether the particular threat applies to the configuration of the particular asset, and then determining the risk metric according to whether the particular threat applies to the configuration of the particular asset.

Analyzing the vulnerability detection data for the particular asset to determine whether the particular asset is vulnerable to the particular threat can include determining a predicate categorization for the particular asset for the particular threat of vulnerable, not vulnerable, or unknown vulnerability. Determining from the threat definition data and the countermeasure detection data whether the particular asset is protected by one of the countermeasures identified for the particular threat can include determining a predicate categorization for the particular asset for the particular threat of protected, not protected, or unknown protection. Determining from the applicability data for the particular threat and the configuration data for the particular asset whether the particular threat applies to the configuration of the particular asset can include determining a predicate categorization for the particular asset for the particular threat of applicable, not applicable, or unknown applicability. The risk metric for each of the assets for each of the threats can be one of: vulnerable, protected, not protected, unknown, and not vulnerable. For each asset and each threat, the risk metric can be vulnerable when the asset has predicate categorizations for the threat of vulnerable and not-protected, and a predicate categorization for the threat of either applicable or unknown applicability, the risk metric can be protected when the asset has a predicate categorization for the threat of protected, a predicate categorization for the threat of either vulnerable or unknown vulnerability, and a predicate categorization for the threat of either applicable or unknown applicability, the risk metric can be not protected when the asset has predicate categorizations for the threat of protected and unknown vulnerability, and a predicate categorization for the threat of either applicable or unknown applicability, the risk metric can be unknown when the asset has predicate categorizations for the threat of unknown protection and unknown vulnerability, and a predicate categorization for the threat of either applicable or unknown applicability, and otherwise, the risk metric can be not vulnerable.

The one or more countermeasures identified for a threat in the threat definition data can include network countermeasures and agent countermeasures, wherein a network countermeasure is a countermeasure that protects an asset by controlling network traffic to the asset, and an agent countermeasure is a countermeasure that protects the asset by executing on the asset. Receiving countermeasure detection data can include receiving protection data identifying one or more assets protected by a sensor; receiving sensor countermeasure data describing one or more countermeasures provided by the sensor; and generating countermeasure detection data for each of the one or more assets protected by the sensor, the countermeasure detection data describing the one or more countermeasures provided by the sensor. The sensor countermeasure data can identify one or more signatures blocked by the sensor, and can associates each signature with an attack identifier for a particular threat corresponding to the signature. The protection data can be received from one or more users. The identification of a countermeasure in the threat definition data can include a product identifier, a version identifier, and data describing one or more settings of the countermeasure.

The method can further include receiving the vulnerability detection data from multiple sources, wherein at least two of the multiple sources provide vulnerability detection data in different formats; and normalizing the received vulnerability detection data so that the data is in a common format. The method can further include receiving the countermeasure detection data from multiple sources, wherein at least two of the multiple sources provide countermeasure detection data in different formats; and normalizing the countermeasure detection data so that the data is in a common format.

The threat definition data can further include a respective risk score for each of the one or more threats, the risk score for a threat measuring how likely the threat is to affect an asset; and the risk metric for the particular asset relative to the particular threat can be further determined from the risk score for the particular threat. The threat definition data can further include a respective confidence score for each countermeasure for each of the one or more threats, the confidence score for a counter measure and a threat measuring how likely the countermeasure is to reduce a risk that the threat will affect an asset. The risk metric for the particular asset relative to the particular threat can be further determined from the confidence scores for one or more countermeasures determined to be protecting the particular asset from the particular threat. The method can further include generating a report summarizing the risk metric of each of the one or more assets.

Particular embodiments of the subject matter described in this specification can be implemented so as to realize one or more of the following advantages. Users can quickly determine the overall exposure of assets on their network to specific threats. This exposure is determined from both whether an individual asset is at risk for a particular threat, and whether an individual asset is protected by one or more countermeasures for the threat. Users can determine which assets are at risk for a particular threat, and how those assets are at risk (e.g., are they vulnerable and not protected, or vulnerable and protected). Users can determine whether assets need remediation (e.g., patching) immediately, or whether remediation can occur during normal maintenance periods. Users can determine where their systems are most at risk, and prioritize updates across their systems. When an asset is attacked, the specific asset can be identified. The risk metric for that asset, and optionally other assets, can be updated accordingly. Users can use the risk metrics for assets to prioritize updates for assets. Metrics can be tracked over time. Overall system metrics can be generated from the asset metrics, and these metrics can be compared to thresholds to allow users to determine whether their system needs improvement. For example, one threshold might indicate that the security risk of the system is unacceptable, while another threshold might indicate that a desired amount of security is in place.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5B illustrates an example detailed risk report for a particular asset.

Like reference numbers and designations in the various drawings indicate like elements.

DETAILED DESCRIPTION

§1.0 Asset System Overview

Figure 1:
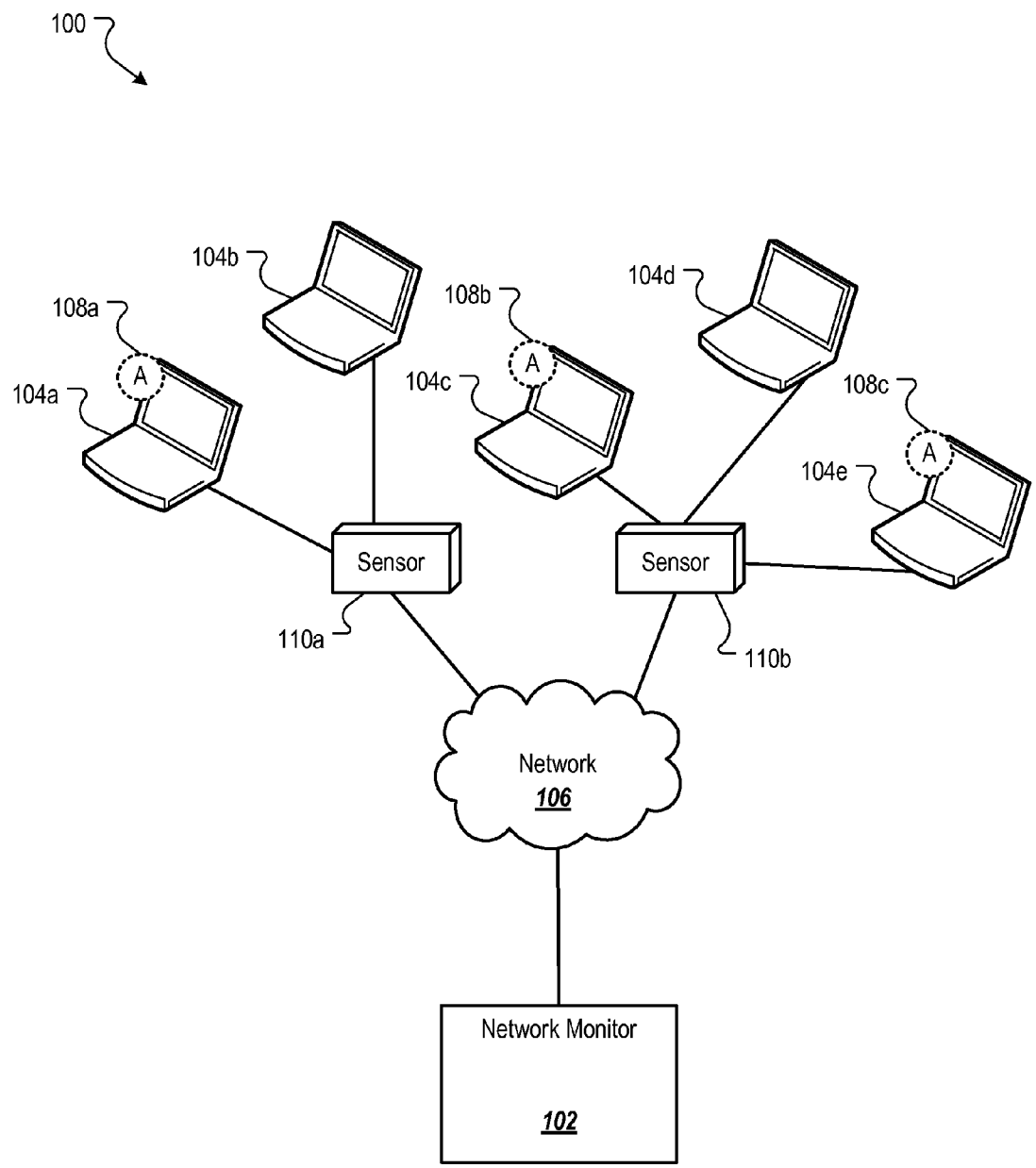
FIG. 1 illustrates an example asset system monitored by a network monitor.

FIG. 1 illustrates an example asset system 100 monitored by a network monitor 102. The assets 104 in the system 100 are connected to each other, and optionally to other systems, by a network 106. The assets 104 are monitored by two kinds of sensors: agent-based sensors 108 and network-based sensors 110. The agent-based sensors 108 and the network based sensors 110 monitor the assets themselves and/or network traffic to and from the assets. For illustrative purpose, the sensors below are described as both monitoring the assets and protecting the assets by providing one or more countermeasures. However, the monitoring and countermeasure functionality does not have to be provided by the same sensor.

The agent-based sensors 108 and network-based sensors 110 can include one or more countermeasures that are part of the sensor. These countermeasures are software programs and/or hardware that protect assets from various threats. Each countermeasure reduces the risk that a threat will affect an asset. A countermeasure protects against a threat by detecting and stopping an attack corresponding to the threat, by detecting and stopping activities associated with the attack, or by mitigating damage caused by an attack. For example, a countermeasure may be configured to detect data having a signature associated with a particular attack, and block data with that signature. As another example, a countermeasure may generate back-up copies of particular files targeted by an attack, so that even if the attack attacks the files, they can be restored. Example countermeasures include, but are not limited to, hardware firewalls, software firewalls, data loss prevention systems, web proxies, mail filters, host-based intrusion prevention systems, network-based intrusion prevention systems, rate-based intrusion prevention systems, content-based intrusion prevention systems, intrusion detection systems, and virus detection software.

Countermeasures can also be partial countermeasures that do not completely protect from or mitigate the effects of an attack. For example, a partial countermeasure might block some, but not all, of the network traffic associated with a particular attack. As another example, if a threat needs either direct physical access or network access to compromise an asset, an example partial countermeasure would block network access to the asset, but not physical access.

The agent-based sensors 108 are software-based sensors that are installed on respective assets 104. For example, agent-based sensor 108*a* is installed on asset 104*a*, agent-based sensor 108*b* is installed on asset 104*c*, and agent-based sensor 108*c* is installed on asset 104*e*. The agent-based sensors 108 run various analyses on their respective assets 104, for example, to identify vulnerabilities on the assets 104 or to identify viruses or other malware executing on the assets 104. The agent-based sensors may also provide one or more countermeasures for threats, as described below. Example agent-based sensors include antivirus software.

The network-based sensors 110 are hardware devices and/or software in a data communication path between assets 104 protected by the sensor and the network resources that the asset is attempting to access. For example, sensor 110*a* is connected to assets 104*a* and 104*b*, and sensor 110*b* is connected to assets 104*c*, 104*d*, and 104*e*. While FIG. 1 illustrates a single network-based sensor 110 in a communication path each asset, other configurations are possible. For example, multiple network-based sensors 110 can be connected to the same asset 104, and some assets 104 may not be connected to any network-based sensors 110.

When an asset 104 tries to send information through the network 106 or receive information over the network 106 through a network-based sensor 110, the sensor analyzes information about the asset 104 and the information being sent or received and determines whether to allow the communication. An example network-based sensor includes one or more processors, a memory subsystem, and an input/output subsystem. The one or more processors are programmed according to instructions stored in the memory subsystem, and monitor the network traffic passing through the input/output subsystem. The one or more processors are programmed to take one or more protective actions on their own, or to query a sensor control system (not shown) and take further actions as instructed by the sensor control system 102.

Example network-based sensors include network access control systems, firewalls, routers, switches, bridges, hubs, web proxies, application proxies, gateways, network access control systems, mail filters, virtual private networks, intrusion prevention systems and intrusion detection systems.

The network monitor 102 is one or more computers, each of which includes one or more processors, a memory subsystem, and an input/output subsystem. The network monitor 102 is programmed to process data about potential threats on the network, protections provided by the sensors, vulnerabilities of the assets, and actual attacks on the assets, in order to generate a risk metric for the assets and respond appropriately when assets are attacked.

§2.0 Determining Risk Metrics

The network monitor 102 provides a risk metric functionality. The risk metric functionality assigns a risk metric to each asset on the network for each of a group of potential attacks (e.g., threats). The risk metric for a given asset and a given potential attack is determined according to whether the asset is vulnerable to the attack and whether countermeasures are in place to protect the asset from an attack. An asset is vulnerable to a potential attack when the asset has hardware or software with a vulnerability that can be exploited by the attack. An asset has countermeasures in place when one or more sensors provide countermeasures for the asset to reduce the risk of the attack affecting the asset.

The risk metric can be one of a discrete number of categories, for example, vulnerable, not vulnerable, protected, not protected, unknown. Alternatively, the risk metric can be a score (e.g., can fall along a continuous scale from 0 to 1, where higher numbers indicate a higher risk metric). To determine the appropriate risk metric for assets for threats, the network monitor 102 uses a risk classifier that receives data from multiple sources and analyzes, for each asset for each threat, the applicability of a threat, the vulnerability of the asset to the threat, and the countermeasures in place for the threat.

§2.1 Data Used During Risk Metric Generation

Figure 2:
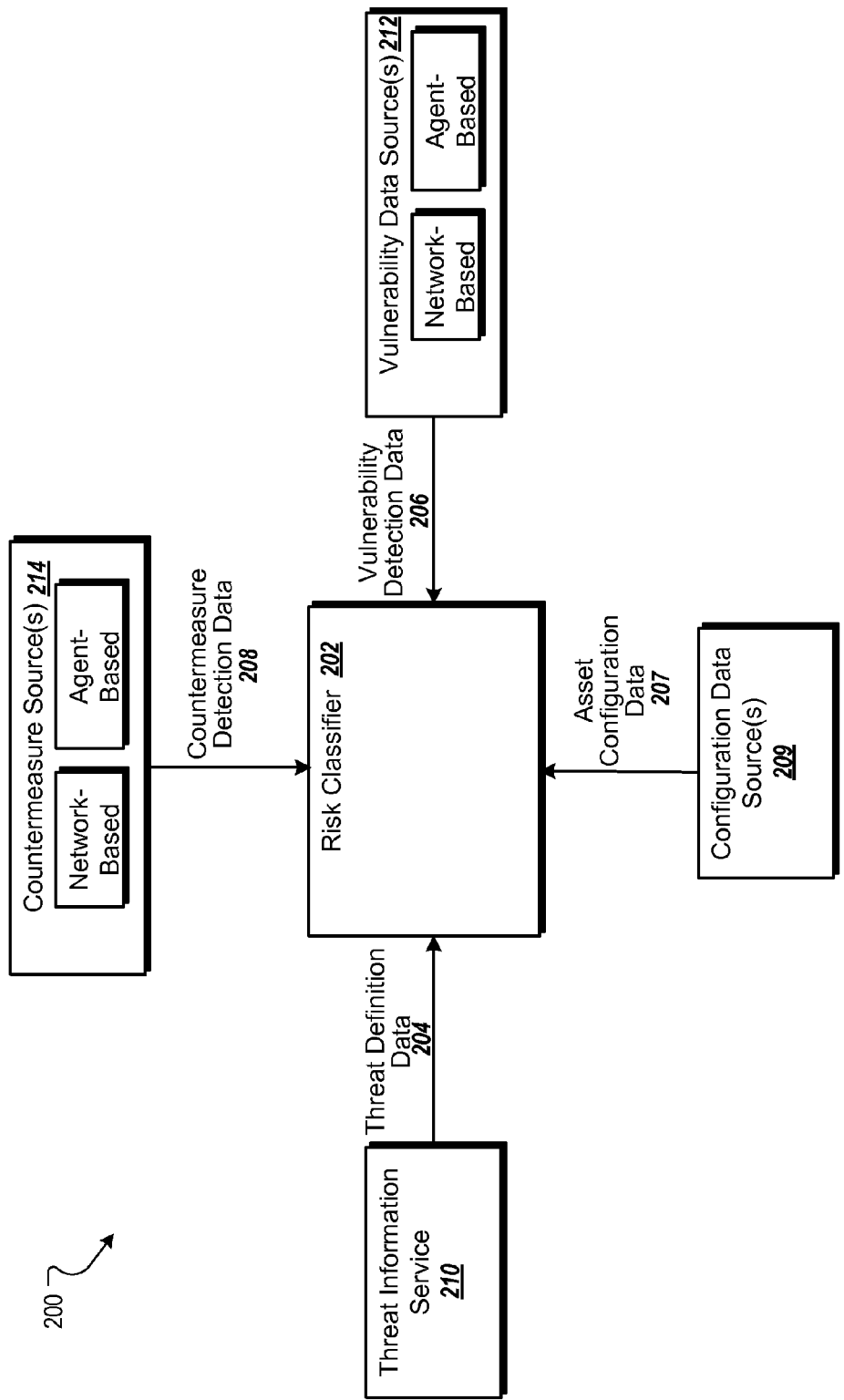
FIG. 2 illustrates an example of the sources of data used a risk classifier.

FIG. 2 illustrates an example of the sources of data used by a risk classifier 202. The risk classifier 202 receives one or more of threat definition data 204, vulnerability detection data 206, asset configuration data 207, and countermeasure detection data 208. The threat definition data describes identified threats and what countermeasures protect assets from the threats. The vulnerability detection data 206 specifies, for each asset and for each threat, whether the asset is vulnerable to the threat or not vulnerable to the threat. The configuration data 207 specifies, for each asset, details of the configuration of the asset. The countermeasure detection data 208 specifies, for each asset, what countermeasures are protecting the asset.

§2.1.1 Asset Configuration Data

The asset configuration data 207 is received from one or more configuration data source(s) 209. In some implementations, the configuration data source(s) 209 are one or more data aggregators. A data aggregator is one or more servers that receive configuration data, aggregate the data, and format it in a format usable by the risk classifier 202. The data aggregators can receive configuration data from the assets themselves or from the sensors monitoring the assets. Example data aggregators include Mcafee ePolicy Orchestrator®, available from McAfee of Santa Clara, Calif., and Active Directory®, available from Microsoft Corporation of Redmond, Wash. For example, a data aggregator can maintain an asset data repository with details on asset configurations. Alternatively, the configuration data source(s) 209 are the assets and/or sensors themselves. When the configuration data source(s) 209 are the assets and/or sensors themselves, the configuration data is not aggregated when it is received by the risk classifier 202, and the risk classifier aggregates the data itself.

The configuration of an asset is a hardware and/or software configuration that determines whether a threat is applicable to an asset. In general, the configuration of the asset can include one or more of the physical configuration of the asset, the software running on the asset, and the configuration of the software running on the asset. Examples of configurations include particular families of operating systems (e.g., Windows™, Linux™, Apple OS™), specific versions of operating systems (e.g., Windows Vista™), particular network port settings (e.g., network port 8 is open), and particular software products executing on the system (e.g., a particular word processor or a particular web server). In some implementations, the configuration data does not include countermeasures in place for the asset, or whether the asset is vulnerable to a particular threat.

§2.1.2 Threat Definition Data

The threat definition data 204 is received from a threat information service 210. The threat information service 210 identifies threats and countermeasures that protect against the threats, and then provides the data to the risk classifier 202. In some implementations, the threat information service 210 can provide a threat feed with the threat definition data to the risk classifier 202 through a network. The threat feed can be, for example, threat definition data sent over the network either as needed, or according to a predefined schedule.

The threat definition data identifies one or more threats and specifies, for each threat, the countermeasures that protect against the threat. The threat definition data 204 also specifies which sensors and/or which software products executing on the sensors can detect the attack. For example, suppose threat A can attack all machines on a network with a specific vulnerability and that product B can detect the vulnerability when it has setting C. Furthermore, product D provides countermeasures that mitigate the effect of the threat. In this case, the threat definition data can specify that threat A attacks all machines, that product B with setting C can detect the vulnerability to the threat, and that product D provides countermeasures that protect against the threat.

The data specifying the countermeasures that mitigate the effect of a threat can also include required system settings for the particular configurations of the countermeasures. For example, these settings might include a version of a signature file that must be used by a software product, or might include a product identifier, a product version identifier, and data describing other settings of the software product. The data may also identify some of the countermeasures as partial countermeasures.

The threat definition data 204 can also optionally include applicability data for each threat. The applicability data specifies a configuration that an asset must have in order to be vulnerable to the threat. For example, the applicability data can specify that the threat only attacks particular operating systems or particular software products installed on an asset. The applicability data can also specify that the threat only attacks particular versions of products, or products configured a particular way.

In some implementations, the threat definition data 204 also includes a risk score for the threat and/or a countermeasure confidence score for each countermeasure that protects against the threat. The risk score is an estimate of how likely the threat is to affect assets, and the confidence score is an estimate of how likely the countermeasure is to reduce the risk that the threat will affect the asset.

The threat definition data may also include other information about the threat, for example, a brief description of the threat, a title of the threat, an estimate of the importance of the threat, an identifier of the vendor(s) whose products are attacked by the threat, and recommendations on how to mitigate the effects of the threat.

In some implementations, the threat definition data has a hierarchical structure (e.g., multiple tiers). For example, the first tier can include a general identification of the products that are vulnerable to the threat such as the name of a software vendor or the name of a particular product vulnerable to the threat. Additional tiers can include additional details on needed configurations of the assets or other details of the threat, for example, particular product versions or settings including the applicability data described above.

§2.1.3 Vulnerability Detection Data

The vulnerability detection data 206 is received from one or more vulnerability data source(s) 212. In some implementations, the vulnerability data source(s) 212 are one or more data aggregators. The data aggregators receive vulnerability detection data from individual sensors in the system. The individual sensors can be agent-based sensors and/or network-based sensors. A data aggregator is one or more servers that receive configuration data, aggregate the data, and format it in a format usable by the risk classifier 202. The data aggregators can be the same as, or different from, the data aggregators that are the configuration data source(s) 209. The data aggregators can receive vulnerability data from the assets themselves or from the sensors monitoring the assets. An example data aggregator is Mcafee ePolicy Orchestrator®, available from McAfee® of Santa Clara, Calif. Alternatively, the vulnerability data source(s) 212 are the assets and/or sensors themselves. When the vulnerability data source(s) 212 are the assets and/or sensors themselves, the vulnerability data is not aggregated when it is received by the risk classifier 202, and the risk classifier aggregates the data itself.

The vulnerability detection data 206 for a given asset specifies what tests were run by sensors protecting the asset, as well as the outcome of those tests. Example tests include virus scans, vulnerability analyses, system configuration checks, policy compliance checks, network traffic checks (e.g., provided by a firewall), and tests performed by intrusion prevention systems and intrusion detection systems. Conventional tests only report when an asset is vulnerable. If nothing is reported, it is unknown whether the asset is not vulnerable, or whether the asset was not tested. The vulnerability detection data 206 therefore allows the risk classifier 202 to determine, in some cases, that an asset has a vulnerability that can be exploited by a threat, and to determine, in other cases, that the asset does not have the vulnerability.

Multiple sensors may test for the same threat. In that case, the vulnerability detection data 206 can include the outcome of all of the tests for the threat (optionally normalized, as described below). Alternatively, the vulnerability detection data 206 may include the outcome for only a single test, for example, a test that found the asset vulnerable or a test that found that the asset was not vulnerable.

§2.1.4 Countermeasure Detection Data

The countermeasure detection data 208 is received from countermeasure source(s) 214. In general, the countermeasure detection data 208 specifies, for a given asset, what countermeasures are in place to protect the asset. In some implementations, the countermeasure detection data 208 also specifies what countermeasures are not protecting the asset. A countermeasure is not protecting an asset, for example, when it is not in place at all, or when it is in place to protect the asset but is not properly configured.

The countermeasure source(s) 214 are sources that store the settings of individual sensors in the network, as well as data specifying which assets are protected by which sensors. For example, the countermeasure source(s) can be one or more computers that receive data about the protection provided by sensors in the network and data about which sensors protect which assets. The countermeasure source(s) aggregate the data to determine which countermeasures are in place to protect each asset. An example countermeasure data source is Mcafee ePolicy Orchestrator®, available from McAfee® of Santa Clara, Calif.

Countermeasures can be provided by the network-based sensors in the network, the agent-based sensors in the network or both. In general, the countermeasure detection data 206 specifies which countermeasures are in place and the settings for each countermeasure. Example settings include an identification of the product providing the countermeasure, a product version, product settings. Other example settings include one or more signatures of threats (e.g., file signatures or network traffic signatures) that are blocked by the countermeasure.

When a countermeasure is provided by an agent-based sensor running on the asset, it is clear that the countermeasure is protecting the asset. However, network-based countermeasures are remote from the assets they are protecting. Therefore, additional data is needed to associate network-based countermeasures with the assets they protect. The countermeasure source(s) 214 must first determine which assets are monitored by which network-based sensors, and then associate, for each sensor, the countermeasures provided by the sensor with each of the assets monitored by the sensor.

There are two primary ways sensors can be associated with the assets they monitor: users can manually associate the assets with the sensors, or the assets can be automatically associated with the sensors.

In some implementations, users manually associate assets with sensors through various user interfaces. For example, one user interface allows users to manually specify the identity of each asset protected by each sensor in the network. This approach leads to maximum accuracy. However, it can be inefficient for large asset systems, e.g., an enterprise system including thousands of client computers. Alternatively, users can be presented with a user interface that allows them to specify a series of rules for associating assets with sensors. The rules can be based, for example, on Internet Protocol (IP) address ranges, nodes through which assets connect to the network, Media Access Control (MAC) address ranges, NetBIOS names of assets, or other user-specified categories, such as groups of assets defined by users or properties of assets tagged by users.

In other implementations, the countermeasure source(s) 214 can automatically correlate sensors with assets based on alerts received from the sensors. Each alert identifies an attack on an asset that was detected by the sensor. For example, when a sensor detects an attack on a particular IP address, the countermeasure source(s) 214 can determine that the sensor is protecting an asset with that particular IP address.

However, there are problems with this approach. First, the IP address does not always uniquely identify the asset. Because the IP address is not a unique identifier, in large networks, it is possible that two different assets have the same IP address. This can occur, for example, when two routers for two different sub-networks each assign a given IP address to an asset in their networks. Also, IP addresses can change over time as assets are connected to and disconnected from the network. Therefore, an attack on an IP address at one point in time can be an attack on a first asset, and an attack on the same IP address at a different point in time can be an attack on a completely different asset. While each asset has one or more unique identifiers (for example, a MAC address), this data is often not included in the alert data, and thus cannot be used to identify the asset.

In some implementations, this problem is solved when the alerts do contain the unique identifiers for the assets. However, as noted above, this data is rarely included in attack data. As an alternative, when the countermeasure source(s) 214 are unsure which asset to associate with a given sensor, the source(s) 214 can make a selection, for example, an arbitrary selection. After the selection is made, the countermeasure source(s) can receive input from a user manually override the association. This input is received, for example, through a user interface.

In some implementations, the data associating sensors with assets can associate a sub-part of the sensor with the asset, when that sub-part protects the asset. For example, if a particular port on a network-based sensor, or a particular software program running on a sensor protects an asset, the association can further specify the port or software program.

§2.1.5 Normalizing and Reconciling the Data

The data described above is received from different sources and is not necessarily in the same format. Therefore, the risk classifier 202 may have to normalize the data before it can be used. The risk classifier 202 normalizes the data by using source-specific reconcilers that format the data received from a given source into a standard format. For example, an enterprise may receive data from two products, product A and product B. Product A may provide the data in one format, and product B may provide the data in a different format. The risk classifier 202 uses a reconciler specific to product A to translate the data from Product A into a format that can be used by the risk classifier 202. Similarly, the risk classifier 202 uses a reconciler specific to product B to translate the data from product B into a format that can be used by the risk classifier. Each source-specific reconciler can be, for example, one or more computers or one or more software programs on one or more computers. Each source-specific reconcilers translate the data, for example, using a table that maps identifiers used by the specific source to identifiers used by the risk classifier 202.

§2.2 Example Architecture of a Risk Classifier

Figure 3:
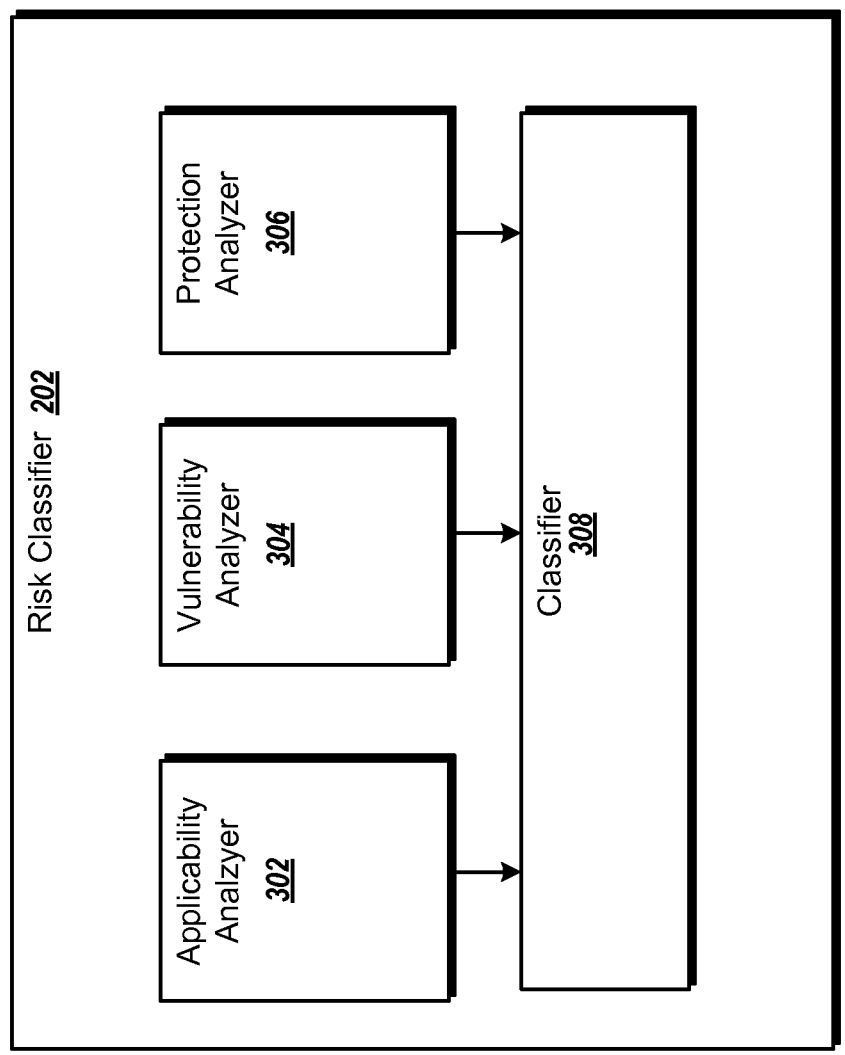
FIG. 3 illustrates an example architecture of a risk classifier.

FIG. 3 illustrates an example architecture of a risk classifier 202. The risk classifier 202 includes an applicability analyzer 302, a vulnerability analyzer 304, and a protection analyzer 306. While three analyzers are shown in FIG. 3, different analyzers can alternatively be used by the risk classifier 202. For example, the risk classifier 202 can include just a vulnerability analyzer 304 and a protection analyzer 306.

Each of the analyzers 302, 304, and 306 analyzes data for an asset, and determines a predicate classification for the asset and the threat. The classifier 308 then determines a final risk metric for the asset and the threat from the predicate categorizations.

The applicability analyzer 302 determines, for each asset and for each threat, whether the threat is applicable to the asset. A threat is applicable to an asset when the asset is running software that is of a type that can have a vulnerability that is exploited by the threat. For example, if a particular operating system has a known vulnerability that is exploited by a threat, and an asset is running that operating system, the threat is applicable to the asset. This is true regardless of whether the operating system on the asset has the vulnerability, or has been remediated to remove the vulnerability. The applicability analyzer 302 compares applicability data for a given threat to configuration data for a given asset to determine whether the given threat is applicable to the given asset. The applicability data and configuration data are described in more detail above, with reference to FIG. 2. The applicability analyzer 302 determines that the threat is applicable to the asset when the applicability data matches the configuration data. The applicability analyzer 302 determines that the threat is not applicable to the asset when the applicability data does not match the configuration data. The applicability analyzer 302 determines that the applicability is unknown when either configuration data or applicability data for the asset and the threat are not available. The predicate categorization (applicable/not-applicable/unknown) made by the applicability analyzer 302 is then provided to the classifier 308.

In some implementations, the applicability analyzer 302 determines that a threat is applicable to an asset when the applicability data for the threat specifies a configuration that exactly matches the configuration of the asset. In other implementations, the applicability analyzer 302 determines that a threat is applicable to an asset when the configuration specified by the applicability data only partially matches the configuration of the asset. The configuration specified by the applicability data partially matches the configuration of the asset when some aspect of the configuration specified in the applicability data matches the configuration data for the asset, but some other aspect does not. For example, the applicability analyzer 302 can determine that the applicability data for a threat partially matches the configuration of an asset when the operating system targeted by the threat and the operating system running on the asset are the same family, but not identical operating systems.

The vulnerability analyzer 304 determines, for each asset for each threat, whether the asset is vulnerable to the threat. An asset is vulnerable to a threat when the asset is running software that has a known vulnerability that can be exploited by the threat, and the problem has not been patched or otherwise remediated. In some implementations, the vulnerability analyzer 304 only makes the determination when the applicability analyzer 302 has determined that the threat is applicable to the asset.

The vulnerability analyzer makes a determination for a given asset and a given threat by analyzing the vulnerability detection data for the asset and the threat. The vulnerability analyzer 304 first analyzes the data to determine whether any test whose outcome is included in the vulnerability detection data identified the asset as being vulnerable to the threat. If so, the vulnerability analyzer determines that the asset has a predicate categorization of vulnerable to the threat. If not, the vulnerability analyzer next analyzes the data to determine whether any test identified the asset as being not vulnerable to the threat. If so, the vulnerability analyzer 304 determines that the asset has a predicate categorization of not vulnerable to the threat. Finally, if no test whose outcome is included in the vulnerability detection data identified the asset as being vulnerable or not vulnerable to the threat, the vulnerability analyzer 304 determines that the asset has a predicate categorization of unknown for the threat.

The protection analyzer 306 analyzes the countermeasures in place for a given asset for a given threat to determine whether the asset is protected by a countermeasure for the threat. To do this analysis, the protection analyzer 408 identifies the countermeasures for the threat specified in the threat definition data for the threat. The protection analyzer 408 also identifies the countermeasures protecting the asset from the countermeasure detection data. The protection analyzer 408 then determines whether any of the countermeasures for the threat are protecting the asset. If so, the protection analyzer 408 determines that the asset has a predicate classification of protected for the threat. Otherwise, the protection analyzer 408 determines whether the data indicates that countermeasures for the threat are not protecting the asset. If the countermeasures are not protecting the asset, the protection analyzer 408 determines that the asset has a predicate classification of not protected for the threat. Otherwise, the protection analyzer 408 determines that the asset has a predicate classification of unknown protection for the threat.

The classifier 308 receives the predicate categorizations for a given asset for a given threat from the applicability analyzer 302, the vulnerability analyzer 304, and the protection analyzer 306. The classifier 308 then determines the final risk metric from the predicate categorizations.

For example, the classifier 308 can select a final risk metric for a given asset and a given threat from the following risk categorizations: vulnerable, protected, not protected, unknown, and not vulnerable. In general, an asset is vulnerable if the asset was found to have a vulnerability to the threat and no countermeasures were detected that could mitigate the threat. An asset is protected when a countermeasure has been detected on the asset that can protect the asset from the threat. An asset is not protected when no countermeasures were detected that protect against the threat, and the asset was not found to have a vulnerability to the threat. An asset is unknown when neither the vulnerability to the threat nor any countermeasures have been detected.

The appropriate categorizations can be determined as follows. The final risk categorization of an asset for a threat is vulnerable when all of the following conditions are met: (1) the asset has a predicate categorization of vulnerable, (2) the asset has a predicate categorization of applicable or unknown applicability, and (3) the asset has a predicate classification of not protected. The final risk categorization is protected when all of the following conditions are met: (1) the asset has a predicate classification of protected for the threat, (2) the asset has a predicate categorization of vulnerable or unknown vulnerability to the threat, and (3) the asset has a predicate categorization of either applicable or unknown applicability for the threat. The final risk categorization is not protected when all of the following conditions are met: (1) the asset has a predicate categorization of not protected, (2) the asset has a predicate categorization of unknown vulnerability to the threat, and (3) the asset has a predicate categorization of either applicability for the threat or unknown applicability for the threat. The final risk categorization is unknown when all of the following conditions are met: (1) the asset has a predicate categorization of unknown protection from the threat, (2) the asset has a predicate categorization of unknown vulnerability, and (3) the asset has a predicate categorization of applicable or unknown applicability of the threat. Otherwise, the final risk categorization is not vulnerable.

These rules are illustrated in the following table:

| Protection Predicate Categorization: | Vulnerable Predicate Categorization | Applicable Predicate Categorization | Final Risk Categorization |
|---|---|---|---|
| Protected | Vulnerable | Not Applicable | Not Vulnerable |
| Protected | Unknown | Not Applicable | Not Vulnerable |
| Protected | Not Vulnerable | Not Applicable | Not Vulnerable |
| Protected | Not Vulnerable | Applicable | Not Vulnerable |
| Not Protected | Vulnerable | Not Applicable | Not Vulnerable |
| Not Protected | Unknown | Not Applicable | Not Vulnerable |
| Not Protected | Not Vulnerable | Not Applicable | Not Vulnerable |
| Not Protected | Not Vulnerable | Applicable | Not Vulnerable |
| Not Protected | Not Vulnerable | Unknown | Not Vulnerable |
| Unknown | Vulnerable | Not Applicable | Not Vulnerable |
| Unknown | Unknown | Not Applicable | Not Vulnerable |

| Protection Predicate Categorization: | Vulnerable Predicate Categorization | Applicable Predicate Categorization | Final Risk Categorization |
|---|---|---|---|
| Unknown | Not Vulnerable | Not Applicable | Not Vulnerable |
| Unknown | Not Vulnerable | Applicable | Not Vulnerable |
| Unknown | Not Vulnerable | Unknown | Not Vulnerable |
| Unknown | Unknown | Applicable | Unknown |
| Unknown | Unknown | Unknown | Unknown |
| Not Protected | Unknown | Applicable | Not Protected |
| Not Protected | Unknown | Unknown | Not Protected |
| Not Protected | Vulnerable | Applicable | Vulnerable |
| Not Protected | Vulnerable | Unknown | Vulnerable |
| Unknown | Vulnerable | Applicable | Vulnerable |
| Unknown | Vulnerable | Unknown | Vulnerable |
| Protected | Vulnerable | Applicable | Protected |
| Protected | Vulnerable | Unknown | Protected |
| Protected | Unknown | Applicable | Protected |
| Protected | Unknown | Unknown | Protected |
| Protected | Not Vulnerable | Unknown | Protected |

Other final categorizations are also possible.

In some implementations, rather than selecting a discrete categorization for the asset for the threat, the classifier 308 can select a different metric, for example, a risk score. In some implementations, the threat definition data includes a risk score for the threat or a countermeasure confidence score for the countermeasures, and the system further bases the final categorization on the risk score and/or the countermeasure confidence score(s) for the countermeasure(s) protecting the asset. For example, the system can generate an at risk score for the asset, where the at risk score is derived from the analysis described above as well as the risk score and/or the countermeasure confidence score(s) for the countermeasure(s) protecting the asset. This risk score can then be the risk metric for the threat.

§2.3 Example Risk Classification Process

Figure 4:
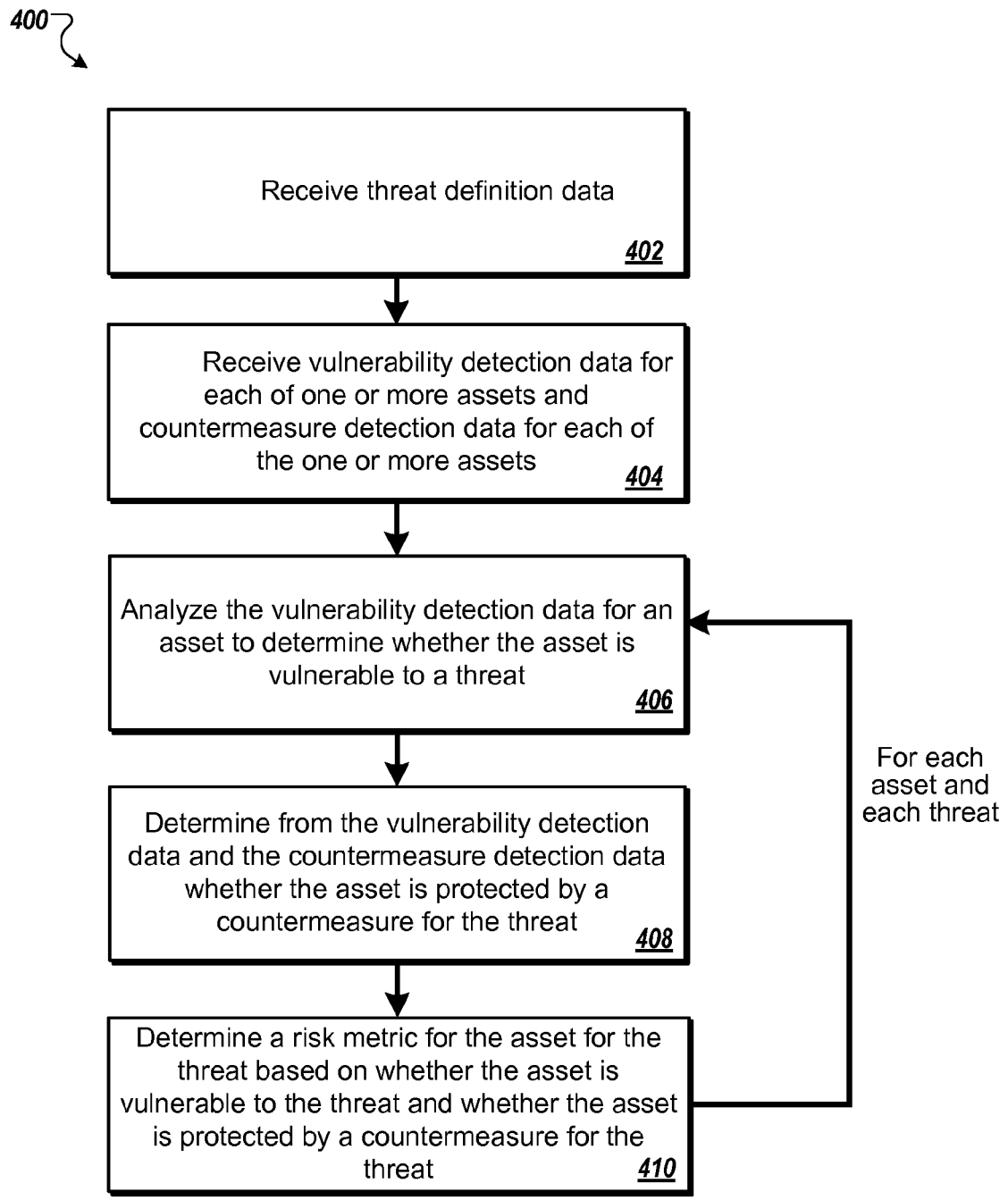
FIG. 4 is a flow diagram of an example process for determining risk classifications for assets.

FIG. 4 is a flow diagram of an example process 400 for determining risk metrics for assets and for threats. The process can be implemented, for example, by the risk classifier 202.

The process 400 receives threat definition data (402), for example, as described above with reference to FIG. 2. The process receives vulnerability detection data for each of one or more assets and countermeasure detection data for each of one or more assets (404), for example, as described above with reference to FIG. 2.

For each asset and each threat, the process determines a risk metric for the asset for the threat. To do this, the process analyzes the vulnerability detection data for the asset to determine whether the asset is vulnerable to the threat (406), for example, as described above with reference to FIG. 3. The process determines from the vulnerability detection data and the countermeasure detection data whether the asset is protected by a countermeasure for the threat (408), for example, as described above with reference to FIG. 3. The process then determines a risk metric for the asset for the threat based on whether the asset is vulnerable to the threat and whether the asset is protected by a countermeasure for the threat (410), for example, as described above with reference to FIG. 3.

§2.4 Example Risk Classification Reports

Figure 5A:
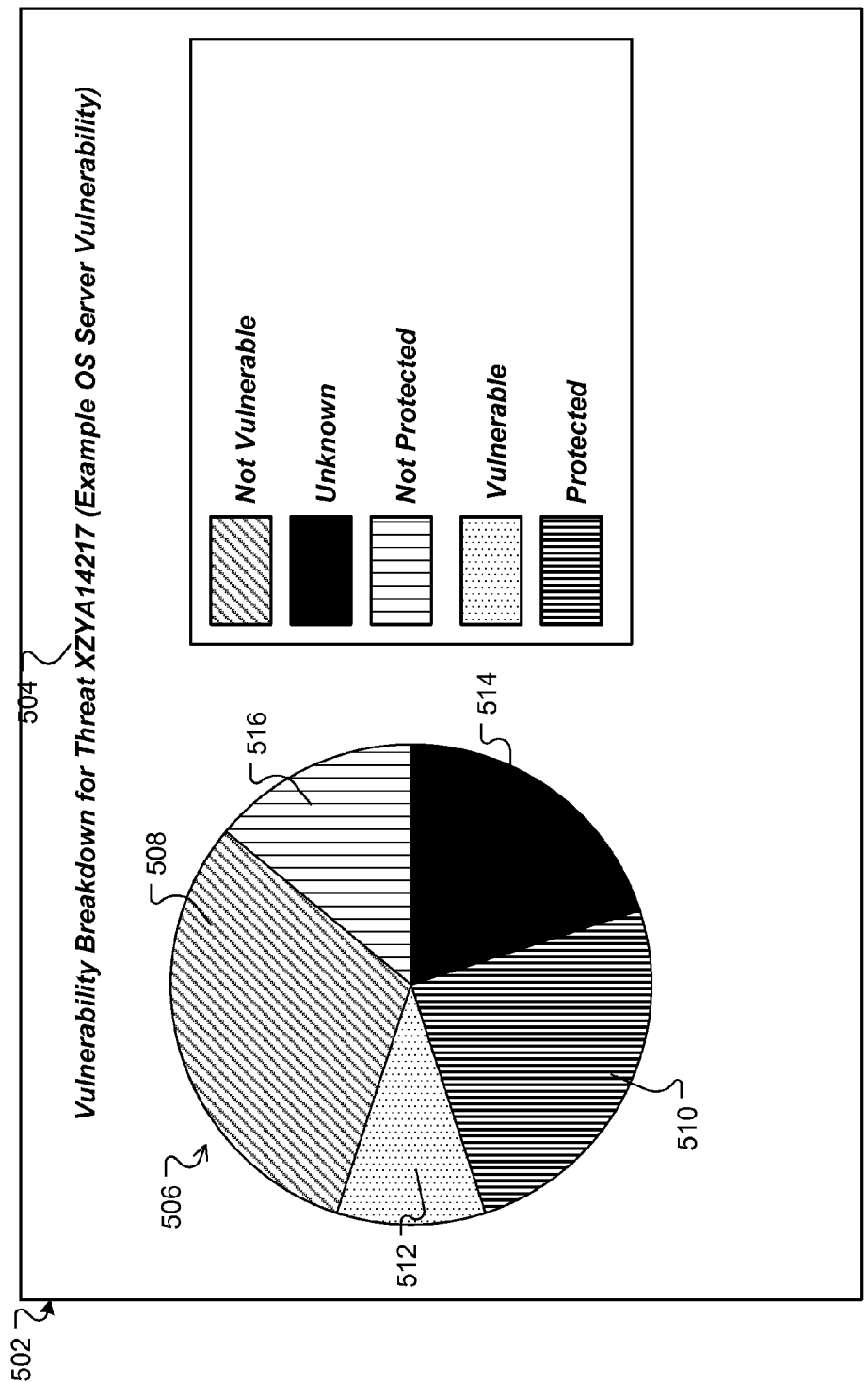
FIG. 5A illustrates an example risk classification report showing the vulnerability breakdown within a user system for a particular threat.

FIG. 5A illustrates an example risk classification report 502 showing the vulnerability breakdown within a user system for a particular threat (Threat XZYA14217). The report identifies the threat 504 and includes a chart 506 that shows how the assets in the system are classified for the threat. In FIG. 5A, the classifications correspond to discrete categorizations of assets. However, other classifications corresponding to other risk metrics can also be used. For example, the chart indicates that a large number of the assets are either not vulnerable 508 to the threat or protected 510 from the threat. However, there are still some assets that are either vulnerable 512 to the threat or that have unknown status for the threat 514.

A system administrator can use the chart 506 to quickly focus efforts to protect the system. For example, a system administrator might start by protecting the vulnerable 512 assets and the unknown 514 assets. The system administrator might also note that the protected 510 assets will eventually need to be remediated so that they are not vulnerable to the threat; however, this remediation can wait until a normal maintenance time, since the assets are protected by one or more countermeasures.

In some implementations, the report is presented in a user interface, for example, on a computer. In these implementations, the system administrator can identify which assets are in each categorization by selecting the categorization of interest (e.g., by clicking on one of the pieces in the chart). This action will present the system administrator with a list of all assets that fall into the particular categorization. The system administrator can then select a particular asset in the list to view a more detailed report for that asset.

FIG. 5B illustrates a detailed risk report 550 for a particular asset. The report includes a summary with the threat name 552, the system name 554, and the asset's overall status 556. The report also includes details of the analysis performed by the risk classifier. This includes data on applicability, vulnerability, and countermeasures for the asset.

The data on applicability lists, for each piece of applicability data in the threat definition data for the threat, the expected configuration 558 of the asset that would result in the threat being applicable, the observed configuration 560 of the asset, and the state 562 of the asset (applicable/not applicable/unknown). The expected configuration 558 column lists each configuration of the asset that would result in the threat being applicable. The observed configuration 560 column lists the actual configuration of the asset. The state 562 is determined as described above. For example, in row 564, the report indicates that threat is applicable to assets having an operating system "example OS." The operating system on the asset is "Example OS Server 2003 (SP 2)." This matches "example OS," and therefore, the threat is applicable.

The data on vulnerability lists, for each software program or sensor monitoring the asset and capable of detecting the threat on the asset, the name of the software or sensor in column 566. The data also lists the expected configuration 568 that the software or sensor would have to have to detect the threat, the observed configuration 570 of the software/sensor (if any), and the state 572 of the asset (vulnerable/not vulnerable/unknown). For example, in row 574, the report indicates that the sensor/software Vulnerability Manager could detect the threat if it had setting 6190 turned on. The Vulnerability Manager was monitoring the asset and had setting 6190 turned on, and the Vulnerability Manager determined that the asset was vulnerable to the threat.

The data on countermeasures lists an identifier of each countermeasure known to protect the asset from the threat in column 576. The data further lists an expected configuration 578 of the countermeasure that is required for the countermeasure to protect against the asset, the observed configuration 580 of the countermeasure protecting the asset, and the state 582 of the asset (protected/not-protected/vulnerable). For example, in row 584, the report indicates that the Intrusion Prevention System can protect against the threat if it has configuration 428. However, countermeasure data did not indicate whether the Intrusion Prevision System was protecting the asset (with or without the appropriate configuration). Therefore, the status of the countermeasure is unknown.

Other reports, other than those shown in FIGS. 5A and 5B can also be generated. For example, a system administrator can be presented with reports showing the performance of countermeasures in the network, for example, how often the countermeasures protect assets against threats, or how often a countermeasure provides redundant protection with another countermeasure. Other example reports include a chart that displays a given number of most popular software vendors and vulnerabilities in any of their products, and a chart that lists the various countermeasure and vulnerability detection products installed on the system and the number of assets protected and/or monitored by each product.

§3.0 Accurately Identifying Assets that are Attacked

The risk metrics described above are based on the configurations of the assets, the configurations of the countermeasures protecting the assets, and the details of the threats. The risk metric described above can be further improved by considering the environment in which the assets themselves are running. For example, risk calculations can be improved by considering whether any assets in the system have been attacked. For example, when an asset is attacked once, it may be at higher risk of being attacked again. Similarly, when an asset is attacked, it indicates that the attack is active in the system and other assets in the same sub-network as the asset, or other assets in the system as a whole, may be at greater risk. For example, if the likelihood of an attack is low in the abstract, the risk metric system might not categorize the risk as being high. However, if the attack is active in the system, the low probability attack poses a higher risk.

To include information about what assets have been attacked in the risk metrics, the risk categorizer 202 needs to be able to uniquely identify each asset that is attacked. This allows the risk categorizer 202 to adjust an asset's risk metric when the asset is attacked, and to also adjust risk metrics of assets that are connected to the asset on a sub-network.

In some cases, the attack data indicating that an asset was attacked uniquely identifies the asset. In these situations, the unique identifier from the attack data can be used to identify the asset. However, attack data often identifies the asset by a non-unique identifier such as an IP address. Therefore, to accurately use the attack information, the risk categorizer 202 needs to be able to map attacks to the specific assets that were attacked. Techniques for determining the specific asset that was attacked are described in more detail below.

Once this mapping is done, the risk metric for the specific asset that was attacked, and optionally other assets in the network, can be updated appropriately. The attack data and unique identification of the asset that was attacked can be used for other purposes as well. For example, the unique identification of the asset can be included in an alert specifying that the asset was attacked by the particular attack. This alert can include both the unique identifier of the asset that was attacked and an identifier of the attack itself.

§3.1 Uniquely Identifying an Asset

Figure 6:
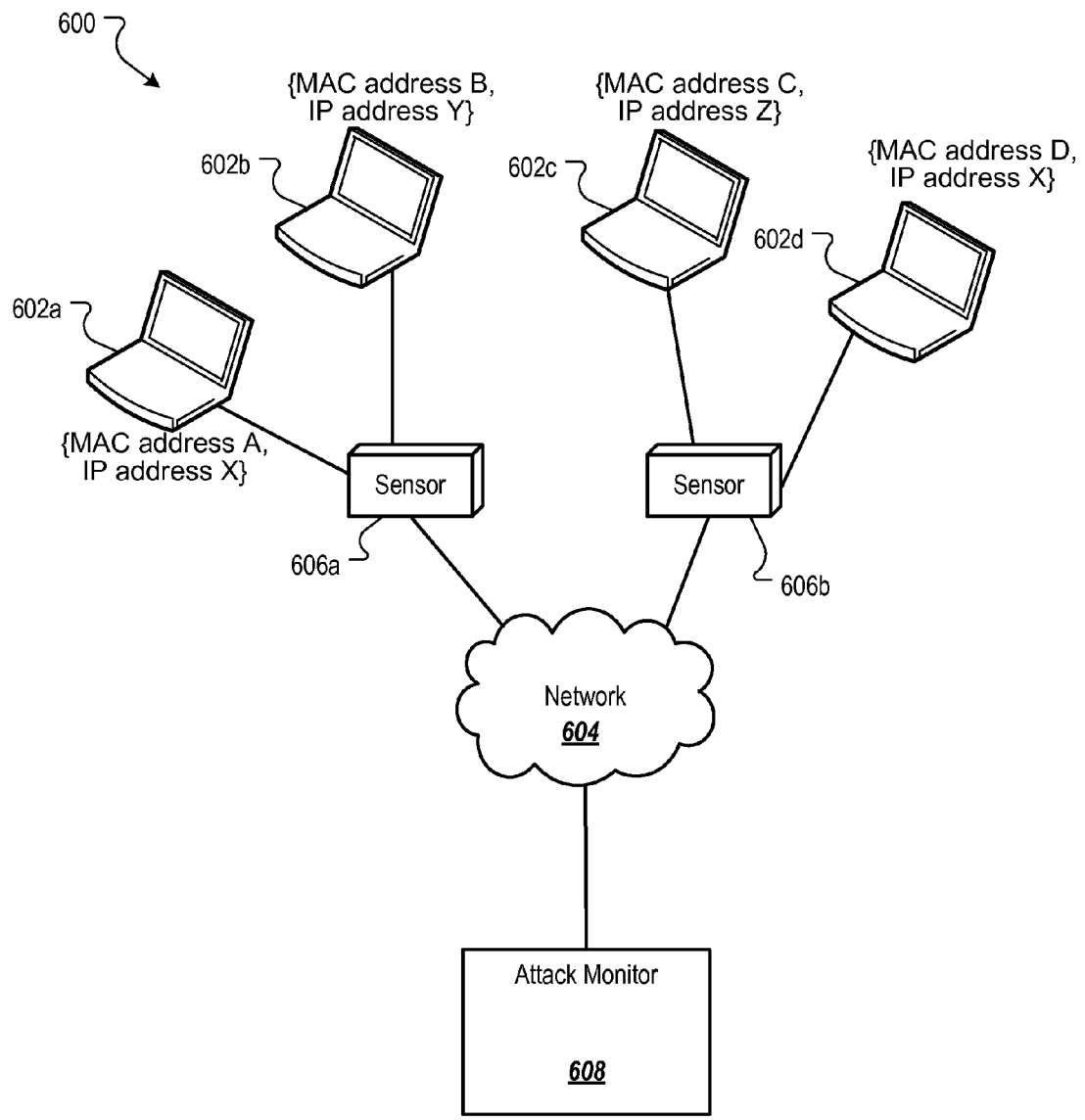
FIG. 6 illustrates an example asset system.

FIG. 6 illustrates an example asset system 600. In the system 600 a number of assets 602 are connected to each other through a network 604. The assets are monitored by sensors 606, such as the network-based sensors described above with reference to FIG. 1.

An attack monitor 608 receives attack data from the sensors, and uniquely identifies the assets that are attacked. The attack data includes non-unique identifiers for assets that are attacked. The attack monitor 608 is one or more computers, each of which includes one or more processors, a memory subsystem, and an input/output subsystem. The attack monitor 608 can be a part of the network monitor 102, or can be a separate system in data communication with the network monitor 102.

Each asset has a unique identifier and at least one non-unique identifier. Unique identifiers are identifiers selected so that every asset in the network has a different identifier. An example unique identifier is a MAC address. Another example unique identifier is a globally unique user identifier generated, for example, by a monitoring component in the asset system. Non-unique identifiers are identifiers that may, but are not necessarily, duplicated in the network. An example non-unique identifier is an IP address. Other example non-unique identifiers include hostnames of assets and NetBIOS names of assets. For example, in the system 600, asset 602a has unique identifier MAC address A and non-unique identifier IP address X, asset 602b has unique identifier MAC address B and non-unique identifier IP address Y, asset 602c has unique identifier MAC address C and non-unique identifier IP address Z, and asset 602d has unique identifier MAC address D and non-unique identifier IP address X. No two assets have the same unique identifier. However, asset 602a and 602d share the same non-unique identifier, IP address X. Additionally, IP addresses can be re-assigned within the same sub-network, and therefore an attack on a particular IP address at a first time, and an attack on the same IP address at a later time may not be attacks on the same asset.

When the attack monitor 608 receives attack data from a sensor indicating that the sensor detected an attack on an asset having a particular non-unique identifier, the attack monitor determines the unique identifier for the asset according to the sensor that detected the attack and the non-unique identifier specified in the attack data. The identity of the sensor helps the attack monitor 608 resolve otherwise ambiguous non-unique identifiers. For example, if the attack monitor 608 received attack data that specified that an asset having the IP address X was attacked, the attack monitor 608 would not know if the attacked asset was asset 602a or 602d, since both have the IP address X. However, if the attack data also specified that sensor 606b detected the attack, the attack monitor 608 could determine that asset 602d having unique identifier MAC address D was attacked, because asset 602d is the only asset protected by sensor 606b that has the IP address X. Techniques for performing this analysis are described in more detail below.

§3.2 Example Architecture of an Attack Monitor

Figure 7:
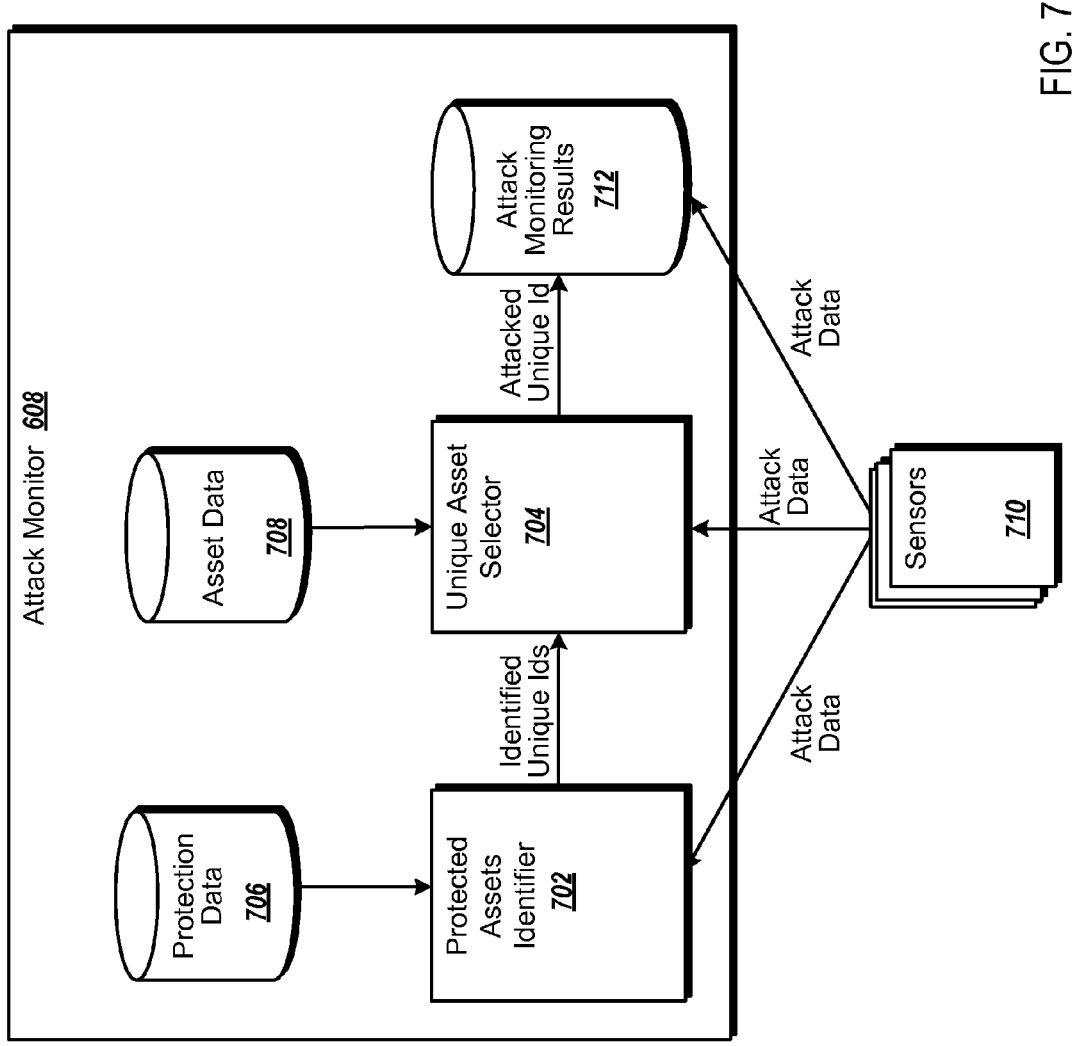
FIG. 7 illustrates an example architecture of an attack monitor.

FIG. 7 illustrates an example architecture of an attack monitor 608. The attack monitor 608 includes a protected assets identifier 702 and a unique asset selector 704.

The attack monitor 608 maintains a protection data store 706 and an asset data store 708. The data in these data stores are used by the protected assets identifier 702 and the unique asset selector 704 to determine the unique identifiers of assets that are attacked.

The protection data store 706 stores protection data for each of the sensors in the system. The protection data for a given sensor maps an identifier of the sensor to the non-unique identifiers of each asset associated with the sensor. These mappings can be received from users, or automatically generated, for example, as described above with reference to FIG. 2.

The asset data store 708 stores asset data for each asset in the system of assets. The asset data maps the unique identifier of each asset to the non-unique identifier of the asset.

The attack monitor 608 receives attack data from one or more attack data sources 710. The attack data sources can 710 be individual sensors themselves, or can be data aggregators that aggregate attack data received from sensors and provide the data in a common format to the attack monitor 608.

When the attack monitor 608 receives attack data, the protected assets identifier 702 processes the attack data along with the protection data 706 to identify the unique identifiers of each asset protected by the sensor that detected the attack. The protected assets identifier 702 does this by obtaining the identifier of the sensor that detected the attack from the attack data, and then determining which unique identifiers are mapped to that identifier in the protection data. The protected assets identifier 702 then provides the identified unique identifiers to the unique asset selector 704.

The unique asset selector 704 receives the attack data and the identified unique identifiers and determines the unique identifier of the asset that was attacked. The unique asset selector 704 identifies the non-unique identifier associated with each unique identifier in the asset data 708. The unique asset selector 704 then determines which of the identified unique identifiers is associated with the non-unique identifier specified in the attack data, and selects that unique identifier as the unique identifier of the asset that was attacked.

The attack monitor 608 then stores the attack data 710, along with the unique identifier of the asset that was attacked, as attack monitoring results data 712. The attack monitoring results data 712 can be stored, for example, in a database that associates attack identifiers with unique identifiers of assets that were attacked.

Figure 8:
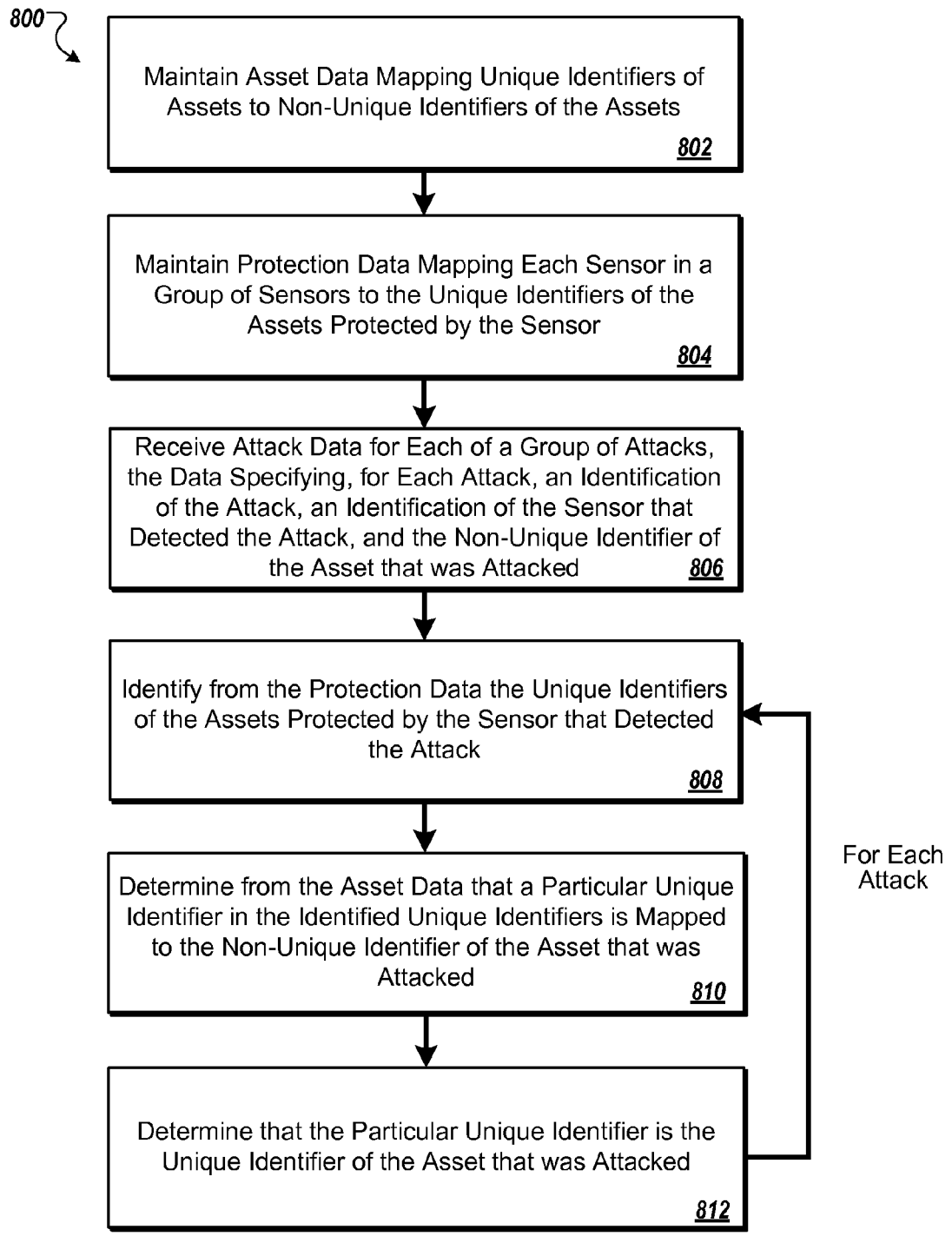
FIG. 8 is a flow diagram of an example process for determining the unique identifier of an asset that was attacked.

§3.3 Example Process for Determining the Unique Identifier of an Asset that was Attacked FIG. 8 is a flow diagram of an example process 800 for determining the unique identifier of an asset that was attacked. The process can be implemented, for example, by the attack monitor 608.

The process 800 maintains asset data mapping unique identifiers of assets to non-unique identifiers of assets (802), for example, as described above with reference to FIG. 7. The process 800 maintains protection data mapping each sensor in a group of sensors to the unique identifiers of the assets protected by the sensor (804), for example, as described above with reference to FIG. 7. The process receives attack data, for each attack in a group of attacks (806). The attack data specifies, for each attack, an identification of the attack, an identification of the sensor that detected the attack, and the non-unique identifier of the asset that was attacked. The process determines the unique identifier for the asset attacked in each attack as follows. The process identifies from the protection data the unique identifiers of the assets protected by the sensor that detected the attack (808), for example, as described above with reference to FIG. 7. The process determines from the asset data that a particular unique identifier in the identified unique identifiers is mapped to the non-unique identifier of the asset that was attacked (810), for example, as described above with reference to FIG. 7. The process determines that the particular unique identifier is the unique identifier of the asset that was attacked (812), for example, as described above with reference to FIG. 7.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. At least one non-transitory machine accessible storage medium having instructions stored thereon, the instructions when executed on a machine, cause the machine to:
    determine whether a particular asset is vulnerable to a particular threat;
    determine whether the particular asset is protected from the particular threat by one or more countermeasures in a set of countermeasures including at least one network-based countermeasure and at least one agent-based countermeasure, wherein determining whether the particular asset is protected from the particular threat includes determining a likelihood that one or more of the network-based countermeasures protects the particular asset and determining a likelihood that one or more of the agent-based countermeasures protects the particular asset; and
    determine a risk metric for the particular asset for the particular threat according to whether the particular asset is vulnerable to the particular threat and whether the particular asset is protected by one or more of the countermeasures for the particular threat.

2. The storage medium of claim 1, wherein the risk metric is further based on determining, for each of a plurality of threats including the particular threat, whether the particular asset is vulnerable to the respective threat and whether the particular asset is protected from the respective threat by one or more countermeasures.

3. The storage medium of claim 1, wherein determining whether the particular asset is vulnerable to the particular threat includes:
    identifying one or more configurations of assets that the particular threat applies to;
    determining a configuration of the particular asset; and
    determining whether the particular threat applies to the configuration of the particular asset.

4. The storage medium of claim 3, wherein:
    determining whether the particular asset is vulnerable includes determining a predicate categorization for the particular asset for the particular threat of vulnerable, not vulnerable, or unknown vulnerability;
    determining whether the particular asset is protected from the particular threat by one or more countermeasures includes determining a predicate categorization for the particular asset for the particular threat of protected, not protected, or unknown protection; and
    determining whether the particular threat applies to the configuration of the particular asset includes determining a predicate categorization for the particular asset for the particular threat of applicable, not applicable, or unknown applicability.

5. The storage medium of claim 1, wherein determining whether the particular asset is protected from the particular threat by one or more countermeasures includes receiving countermeasure detection data describing countermeasures detected as applying to the particular asset.

6. The storage medium of claim 5, wherein receiving countermeasure detection data includes:
receiving protection data identifying one or more assets protected by a sensor;
receiving sensor countermeasure data describing one or more countermeasures provided by the sensor; and
generating countermeasure detection data for each of the one or more assets protected by the sensor, the countermeasure detection data describing the one or more countermeasures provided by the sensor.

7. The storage medium of claim 6, wherein the sensor countermeasure data identifies one or more signatures blocked by the sensor, and associates each signature with an attack identifier for a respective threat corresponding to the signature.

8. The storage medium of claim 5, wherein the countermeasure detection data is received from multiple sources, at least two of the multiple sources provide countermeasure detection data in different formats, and the instructions, when executed, further cause the machine to normalize the countermeasure detection data so that the countermeasure detection data is in a common format.

9. The storage medium of claim 1, wherein determining whether the particular asset is vulnerable includes receiving vulnerability detection data describing vulnerabilities detected as affecting the particular asset.

10. The storage medium of claim 9, wherein the vulnerability detection data is received from multiple sources, wherein at least two of the multiple sources provide vulnerability detection data in different formats, and the instructions, when executed, further cause the machine to normalize the vulnerability detection data so that the vulnerability detection data is in a common format.

11. The storage medium of claim 1, wherein the instructions, when executed, further cause the machine to identify a risk score for a particular threat measuring how likely the particular threat is to affect an asset, wherein the risk metric is determined at least in part from the risk score for the particular threat.

12. The storage medium of claim 1, wherein the instructions, when executed, further cause the machine to identify for the particular threat definition data.

13. The storage medium of claim 12, wherein the threat definition data includes a respective confidence score for each countermeasure for the particular threat measuring how likely the countermeasure is to reduce a risk that the particular threat will affect an asset possessing the countermeasure.

14. The storage medium of claim 1, wherein the instructions, when executed, further cause the machine to generate a report summarizing the risk metric of the particular asset.

15. The storage medium of claim 1, wherein network-based countermeasures include countermeasures that protect assets by controlling network traffic to the respective asset.

16. The storage medium of claim 1, wherein agent-based countermeasures include countermeasures to protect assets by executing on the respective asset.

17. The storage medium of claim 1, wherein the particular asset is determined to be protected by a first network-based countermeasure and a second agent-based countermeasure.

18. A method comprising:
determining whether a particular asset is vulnerable to a particular threat;
determining whether the particular asset is protected from the particular threat by one or more countermeasures in a set of countermeasures including at least one network-based countermeasure and at least one agent-based countermeasure, wherein determining whether the particular asset is protected from the particular threat includes determining a likelihood that one or more of the network-based countermeasures protects the particular asset and determining a likelihood that one or more of the agent-based countermeasures protects the particular asset; and
determining, using at least one data processing apparatus, a risk metric for the particular asset for the particular threat according to whether the particular asset is vulnerable to the particular threat and whether the particular asset is protected by one or more of the countermeasures for the particular threat.

19. The method of claim 18, further comprising:
identifying vulnerability detection data describing vulnerabilities detected as affecting the particular asset; and
identifying countermeasure detection data describing countermeasures detected as applying to the particular asset.

20. The method of claim 18, wherein network-based countermeasures include countermeasures that protect assets by controlling network traffic to the respective asset.

21. The method of claim 18, wherein agent-based countermeasures include countermeasures to protect assets by executing on the respective asset.

22. A system comprising:
a processor; and
a computer storage medium coupled to the processor and including instructions, which, when executed by the processor, cause the processor to perform operations comprising:
determining whether a particular asset is vulnerable to a particular threat;
determining whether the particular asset is protected from the particular threat by one or more countermeasures in a set of countermeasures including at least one network-based countermeasure and at least one agent-based countermeasure, wherein determining whether the particular asset is protected from the particular threat includes determining a likelihood that one or more of the network-based countermeasures protects the particular asset and determining a likelihood that one or more of the agent-based countermeasures protects the particular asset; and
determining, using at least one data processing apparatus, a risk metric for the particular asset for the particular threat according to whether the particular asset is vulnerable to the particular threat and whether the particular asset is protected by one or more of the countermeasures for the particular threat.

* * * * *